United States Patent [19]
Choate

[11] Patent Number: 5,832,107
[45] Date of Patent: Nov. 3, 1998

[54] OPTICAL SYSTEM FOR STEREOSCOPICALLY MEASURING FEATURE HEIGHTS BASED ON LATERAL IMAGE OFFSETS

[75] Inventor: Albert G. Choate, Rush, N.Y.

[73] Assignee: Optical Gaging Products, Inc., Rochester, N.Y.

[21] Appl. No.: 699,436

[22] Filed: Sep. 19, 1996

[51] Int. Cl.$^6$ ............................................. G01B 11/22
[52] U.S. Cl. ............................. 382/154; 356/376
[58] Field of Search ..................... 382/106, 108, 382/153, 154, 162, 164, 294; 356/11, 12, 22, 376, 390; 359/464, 462; 348/128, 139, 159; 250/559.23, 559.31, 559.46

[56] References Cited

U.S. PATENT DOCUMENTS

| | | | |
|---|---|---|---|
| 4,539,701 | 9/1985 | Galbreath et al. | 382/154 |
| 4,601,053 | 7/1986 | Grumet | 382/154 |
| 4,842,411 | 6/1989 | Wood | 356/376 |
| 4,867,545 | 9/1989 | Wakimoto et al. | 350/415 |
| 5,028,799 | 7/1991 | Chen et al. | 250/561 |
| 5,347,363 | 9/1994 | Yamanaka | 356/376 |

*Primary Examiner*—David K. Moore
*Assistant Examiner*—Brian P. Werner
*Attorney, Agent, or Firm*—Shlesinger, Fitzsimmons and Shlesinger

[57] ABSTRACT

Two stereoscopic images of the surface of an inspected object are projected by two different lens systems to two separate video cameras for recording thereby and for display via a CPU on a 3D monitor. The optical axes of the two lens systems are equiangularly spaced from a central Z axis extending normal to the object plane, so that the height of a feature on the surface of the workpice may be calculated by determining the difference in the amount of lateral offset in the X direction from the center of a displayed image of a given feature as shown in one of the displayed images from the amount of its corresponding lateral offset in the other image, and then calculating Z in accordance with the formula Z=the difference in the offset in the X direction divided by twice the tangent of the angle of inclination of a respective viewing axis relative to the Z axis. Alternatively, the two images may be superimposed to form a stereoscopic image, and the two lens systems are shifted on the Z axis until the slight offset images of the feature coincide.

11 Claims, 3 Drawing Sheets

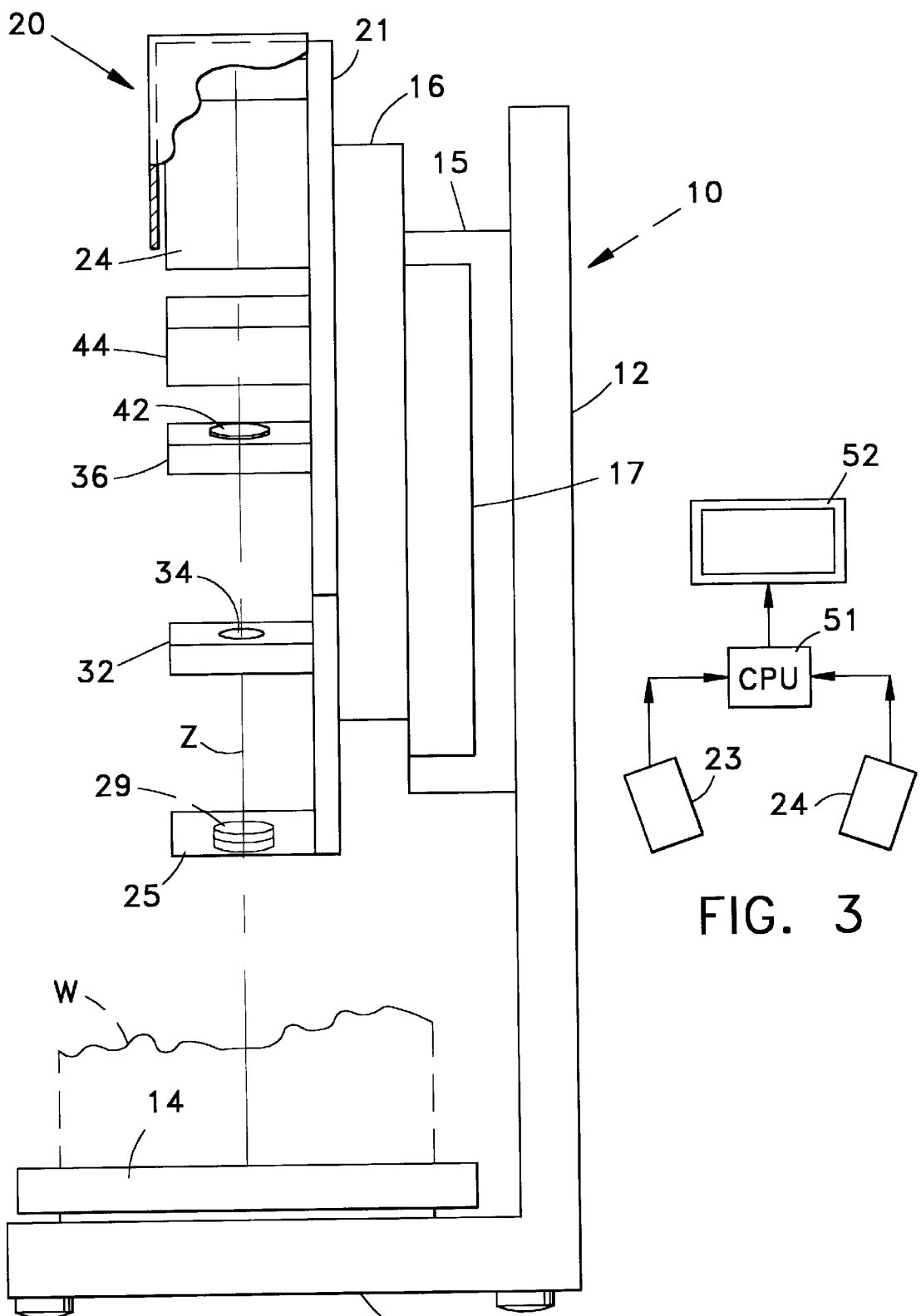

OPTICAL SYSTEM FOR STEREOSCOPICALLY MEASURING FEATURE HEIGHTS BASED ON LATERAL IMAGE OFFSETS

BACKGROUND OF THE INVENTION

This invention relates to optical measuring methods and systems of the type employed in the field of optical dimensional metrology, and more particularly to a novel method of making optical measurements using an improved optical system of the stereoscopic variety, which may provide perspective views of an object that is being inspected. Even more particularly, this invention relates to an improved steroscopic optical system particularly suited for use in inspecting and determining measurements of an object in each of three, intersecting, right-angular directions denoted as X, Y and Z.

While it heretofore has been possible for existing equipment to measure very accurately the dimensions of a particular feature of an inspected object in the X and Y directions (for example in directions which intersect each other at right angles in a horizontal plane), it heretofore has been extremely difficult accurately to determine Z measurements—i.e., the vertical height of various features on the surface of an object being inspected. It has been discovered, however, that by employing an optical system which offers two views of an object angled relative to a central axis, the heights of observable features on the object being inspected are shifted, for example in the X direction, to a greater or lesser degree depending upon their respective heights or relative Z positions. The Z (height) dimension then can be determined by observing the relative shift in the perspective views, i.e., the X distance between the same point (feature) on the two views.

For example this may be effected by employing a 3D video monitor for viewing the relative shift in superimposed images of the inspected object, when the images have been brought into coincidence. Alternatively, one image may be transmitted in the color green, and the other in red, so that when combined to produce superimposed images, only those features of the same height (Z), which therefore exhibit no relative shift in the exposition, would be yellow. The appearance of the colors red and green in the superimposed images would indicate the presence of a relative shift in the views of a given feature and could be used to determine the value Z as noted hereinafter.

Accordingly, it is an object of this invention to provide a novel method for effecting stereoscopic optical measurement of the height of a feature on the surface of an inspected object by employing apparatus which is capable of producing two stereo views of the object, the two views being angled relative to a central axis with respect to the object.

Another object of this invention is to provide novel optical measurement apparatus of the type described, which includes means for producing two stereoscopic dual images by two lens systems that are angled relative to a central axis, and displaying the two images in superimposed form on a 3D video monitor.

Other objects of the invention will be apparent hereinafter from the specification and from the recital of the appended claims, particularly when read in conjunction with the accompanying drawings.

SUMMARY OF THE INVENTION

Two, like, lens systems that are mounted for vertical movement above a workpiece supporting table have their viewing axes equally inclined to opposite sides of a vertical axis Z, and project two images of a workpiece stereoscopicaly via two video cameras and a CPU to a viewing monitor where the images can be viewed separately or superimposed one on the other. The height of a feature on the surface of the workpiece may be calculated by determining the amount of lateral offset in the X direction of a given feature as shown in one of the two images relative to its position as shown in the other image, and then calculating Z in accordance with the formula Z=the amount of offset in the X direction divided by twice the tangent of the angle of inclination of a respective viewing axis relative to the Z axis. Alternatively, the two images may be superimposed to form a steroscopic image, and the two lens systems are shifted on the Z axis until the slight offset images of a feature coincide.

THE DRAWINGS

FIG. 2 is a side elevational view of this apparatus with parts thereof broken away;

FIG. 3 is a diagramatic view of how the images produced by the two video cameras of the apparatus may be coupled by a microprocessor to a conventional 3D video monitor.

DETAILED DESCRIPTION OF THE PREFERRED EMBODIMENTS

Figure 1:
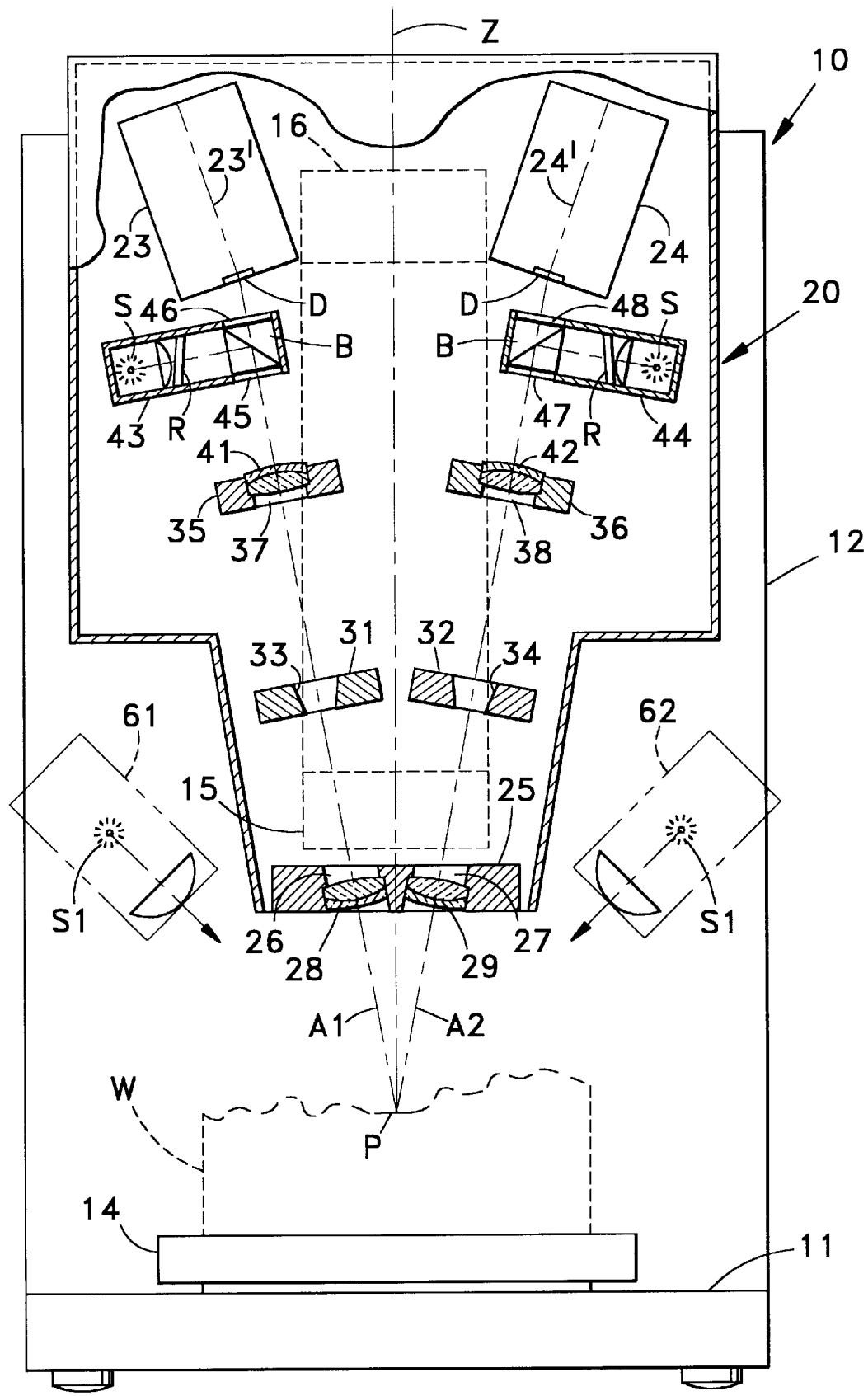
FIG. 1 is a front elevational view of stereoocopic optical measuring apparatus made according to one embodiment of this invention, portions thereof being shown in section.

Referring now to the drawings with numerals of reference, 10 denotes generally a stand comprising a horizontal base 11, and a vertical supporting wall 12, which extends at right angles upwardly from the base 11. A work supporting table 14 is adjustably mounted in a conventional manner on the upper surface of base 11 for limited movement in a horizontal plane, or in a plane parallel to the upper surface of base 11. Table 14 is adapted to support thereon an object or piece of work W (broken lines in FIGS. 1 and 2) which is to be inspected and measured. Secured to the face of wall 12 is a housing 15 for a height adjustment mechanism of conventional design, such as disclosed for example in my U.S. Pat. No. 5,523,583. Mounted for vertical adjustment on the face of housing 15 toward and away from the table 14, and relative to a graduated scale 17 which is secured to one side of housing 15, is a support 16 for the hereinafter described stereoscopic optical system, which is denoted generally by the numeral 20.

Optical system 20 comprises a rigid mounting plate 21 the rear surface of which is fastened to support 16 for vertical adjustment thereby toward and away from table 14. Mounted on the face of plate 21 adjacent the upper corners thereof are two conventional video cameras 23 and 24, which are equi-spaced from a central axis Z that extends vertically with respect to table 14 substantially centrally thereof, and which also have their image planes, as represented by their image detectors D (FIG. 1), inclined to the axis Z as noted hereinafter.

Two magnified images of an object W on table 14 are projected along axes A1 and A2 to the inputs of cameras 23 and 24 by two, identical, telecentric magnification systems. For this purpose a lens mount in the form of a rectangular plate 25 is secured at one edge thereof to the face of the large support plate 21 adjacent the lower edge thereof and projects horizontally therefrom in spaced, parallel relation to the object supporting table 14. Plate 25 has therethrough a pair of spaced, circular openings 26 and 27 the axial centerlines of which are disposed coaxially of the axes A1 and A2, respectively. Mounted in the openings 26 and 27 with their axes registering, respectively, with the axes A1 and A2, are similar relay lenses 28 and 29, respectively.

Secured to and projecting from the face of support plate 21 above the lens mount 25 are two, spaced, rectangular plates or telecentric stop members 31 and 32 which have therethrough inverted, segmental cone-shaped apertures 33 and 34, which are disposed coaxially of the axes A1 and A2, respectively. Secured at one edge thereof and projecting from the face of plate 21 above and in spaced, parallel relation to the telecentric stop members 31 and 32 are two further lens mounts 35 and 36. Secured in central openings 37 and 38 in the mounts 35 and 36, respectively, are achromatic cemented doublet lenses 41 and 42 of 90 mm focal length arranged in the configuration of a unit magnification relay.

Secured at one side thereof to the face of plate 21 beneath and adjacent to the camera 23 and 24, respectively, and above in a generally spaced, parallel relation to the lens mounts 35 and 36, are two, elongate, surface illuminator housings 43 and 44, respectively. Each such housing contains a light source S which, when energized, projects a beam of light through a reticle plate R and onto a beamsplitter B of conventional design, which is mounted in the end of the associated housing remote from the light source S. The use of the reticle R, which may be of the type disclosed in my copending U.S. application Ser. No. 08/558, 793, is optional, and is not always used in housing 43 and 44. When they are employed, the reticle plates R are inclined slightly to the axes of their respective housing 43 and 44 to compensate for the inclination of the axes A1 and A2, and so that their images as projected onto the surface of object W, are not already shifted relative to the surface of object W.

The beamsplitter B in housing 43 registers at one side thereof through an opening 45 with the lens 41 coaxially of axis A1, and at its opposite side through an opening 46 in the upper side of the housing 43 with the image detector D of the camera 23. Similarly, the beamsplitter B in housing 44 registers with an opening 47 in the lower side of housing 44 with the lens 42 coaxially of axis A2, and through a registering opening 48 in the upper side of housing 44 with the image detector D of the camera 24. When the light sources S are energized, light and images of the reticles R are directed by the beamsplitters B downwardly through the registering lenses 41 and 42, and coaxially along the axes A1 and A2 toward the surface of the workpiece W; and in turn, two images, each comprising an image of the workpiece with an image of the reticle R superimposed thereon, are directed upwardly along the axes A1 and A2, respectively, and through the associated beamsplitters for recording by the detectors D of the cameras 23 and 24, respectively. As shown diagramatically in FIG. 3 the outputs of the video cameras 23 and 24 are coupled by a central processing unit 51 to a conventional 3D video monitor 52 having the usual ability to display and measure the recorded images in the above-noted X and Y directions.

Figure 5:
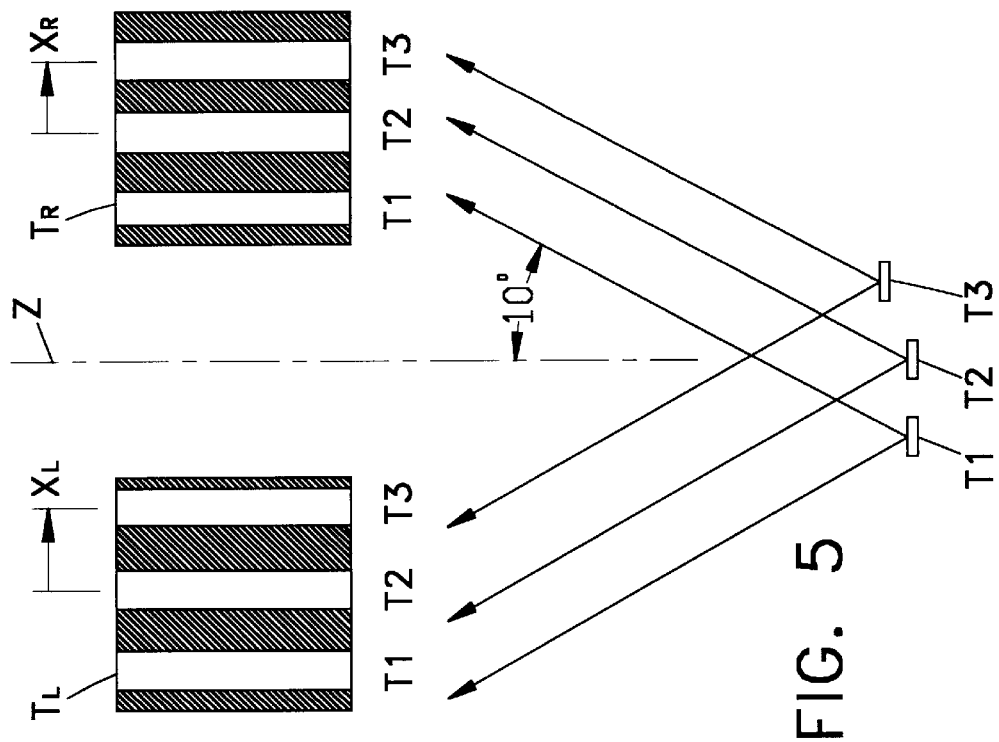
FIG. 5 illustrates two sample images of portions of an object as produced by the two video cameras employed in another embodiment of this apparatus.

As shown in FIG. 1, the viewing angles of the two lens systems, as represented by the axes A1 and A2, respectively, are inclined equally to the central axis Z, for example on the order of 10° each from the axis Z in the embodiment illustrated. Consequently, the object images projected to the cameras 23 and 24 not only will be inverted, but also will be distorted slightly in the X direction. For example, the image of what is a circle in the object plane normally would be oval in the image plane at a respective detector D. To compensate for this distortion the cameras 23 and 24 are also tilted 10° relative to their associated image axes A1 and A2, respectively, and because the image projected to a respective camera is inverted, each camera is not tilted back toward axis Z, but instead is tilted further away from axis Z, so that the axes 23' and 24' of cameras 23 and 24, respectively, are inclined at 20° to axis Z and at 10° to their associated image axes A1 and A2. Thus, although the image plane of each camera as represented by its detector D is inclined at 10° to its associated optical axis A1 or A2, the image of the object produced at a respective object plane (P) will not appear tilted or distorted (i.e., will remain circular rather than oval) because of the compensating tilted position of each image plane. As a consequence, the two images that appear on the monitor 52 can be observed separately, as shown in FIG. 5, or can be superimposed on one another to provide a perspective view of the observed surface of the workpiece W.

Figure 4:
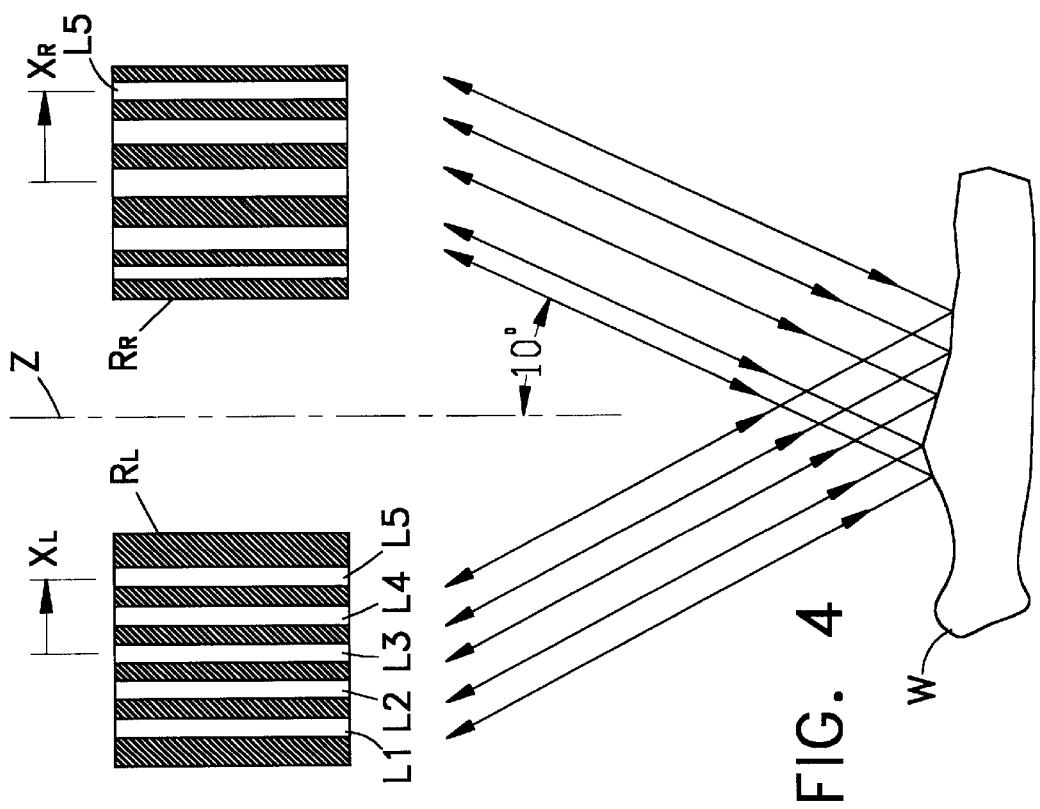
FIG. 4 illustrates diagramatically the projection of one of the two reticle patterns onto the surface of an object, and the reflected as produced by one of the two video cameras employed in this embodiment of this apparatus.

FIG. 4, wherein the 10° viewing angles are distorted for purposes of illustration, ilustrates diagramatically how the image $R_L$ of one of the reticles R, for example the one shown in the left housing 43 in FIG. 1, and comprising a grid of equi-spaced parallel lines, may be projected by the optical system 20 downwardly and obliquely onto the surface of the object W. A combined image of the reticle and workpiece surface can then be reproduced at the monitor 52 via the CPU and the video camera 24 shown at the right in FIG. 1. The reticle image recorded by camera 24 in FIG. 4, wherein the object image is not illustrated, is denoted at $R_R$. As will be apparent from FIG. 4, as a result of the change in height in various features on the surface of object W, the spacing between the grid lines of image $R_R$ has been altered in relation to the height of a respective feature above or below the object plane.

For example, the distance of the grid line L5 from the center of the grid image $R_L$ is denoted as $X_L$, while the distance of the image of this line L5 from the center of image $R_R$ is denoted as $X_R$. In the illustrated embodiment $R_R$ is shown to be slightly larger than $X_L$, because of the slight lateral shift in image $R_R$ caused by variations in the height Z of features on the surface of object W. These height variations can be determined by measuring for each projected grid line the value Z according to the formula $$Z = \frac{X_L - X_R}{2\,\text{TAN}(100)} \; ;$$

and wherein 10° equals the viewing angle of each of the two lens systems. In practice, the CPU can determine the values of Z utilizing conventional software.

Referring now to FIG. 5, wherein the three tongs T1, T2 and T3 of a fork are being inspected by an optical system similar to that of system 20, but without the reticle plates R, $T_L$ denotes the image produced on monitor 52 by the camera 23 shown at the left in FIG. 1, and $T_R$ denotes the image produced by the camera 24 at the right in FIG. 1. Notably tong T3 is bent or otherwise positioned slightly above tongs T1 and T2, which appear to be at the same elevation. The result is that the distance $X_L$ of tong T3 from the center of the left image $T_L$ is slightly greater than the distance $X_R$ between the center of the other, right hand image $T_R$ and its associated image of tong T3. Then the CPU, via conventional software, may determine the height Z of tong T3 above tongs T1 and T2 per the above-noted formula; and the X location of tong T3 can be determined by the formula $$X = \frac{X_L + X_R}{Z}.$$

As an alternative to determining Z via the above-noted formula, the two images $T_L$ and $T_R$ may be shifted into registry by the CPU, thus superimposing one image on the other. If a feature in the superimposed image is above or below the object plane P it will not be in focus, but will exhibit some relative shift as between the two images of the feature. Then, to determine the height of the feature the support 16 may be adjusted vertically until the stereoscopic dual images of the feature displayed on the monitor 52 correlate with one another, and with no relative shift therebetween in the X direction. The scale 17 will then indicated the vertical or Z distance the support 16 was moved to cause the dual images to correlate with one another, and that value will then constitute the height of the feature above or below the object plane P. This vertical adjustment of support 16, and hence the images produced by the dual imaging systems, can be effected manually by an operator observing the images on the monitor 52, or alternatively, can be performed by conventional, computerized imaging analysis. Since the two stereo views or images are made to operate at a relatively high F-number by virtue of the use of the stops 31 and 32, the associated lens systems have the advantage of providing a large depth of focus for observing object relief without refocusing, while on the other hand, the stereo angle offers the range resolving equivalent of a low F-number.

Still another method of determining Z values can be effected by projecting or displaying the two images $T_L$ and $T_R$ in two different colors, for example image $T_L$ in red and $T_R$ in green. Then when the two images are superimposed, those features in the object plane P will appear yellow, while those at a different height, above or below plane P, will be in red and green because of the relative shift in the X direction of the two views of the same feature. The height of such feature is then determined by shifting the support 16 until the two views of that feature merge and become green, and the vertical movement of support 16 as indicated by the scale 17 will constitute the height of the feature relative to plane P.

If desired, additional sources of illumination of an object can be employed in the form of additional light source housings 61 and 62, which are shown in phantom by broken lines in FIG. 1. Housings 61 and 62 may be mounted on the face of wall 12 adjacent the lower edge of the plate 21, and may contain conventional light sources S1 designed to direct light downwardly through conventional lenses mounted in the lower ends thereof, and along axes which are inclined to the vertical axis Z. Housings 61 and 62 are best designed to provide oblique lighting for the surface of a workpiece or object W to supplement the illumination provided by the light sources in the illuminator housings 43 and 44. Also, although FIG. 4 illustrates the projection of only one reticle image from the left lens system in FIG. 1 to the camera 24 in the right hand system, the right lens system could project another reticle pattern, such as array of dots for reception by camera 23, and for computer analysis of the image produced by camera 23. In each of the foregoing embodiments images are not distorted in the Y direction, so Y measurements will be made in a conventional manner.

From the foregoing, it will be apparent that the present invention provides a novel stereoscopic optical measurement system or apparatus which considerably eases and expedites the accurate measurement of dimensions of the observed object not only in the X and Y directions, but also in the vertical or Z direction of measurement. By employing dual, inclined lens systems, which in turn transmit stereoscopic dual images to a monitor via the cameras 23 and 24, it is possible to determine the height of a desired feature on the workpiece simply via software based upon the above-noted formula, or by effecting vertical adjustment of the optical system 20 to cause superimposed, dual images to become correlated one with the other so that no apparent shift or spacing of the two images in the X direction occurs. Moreover, by utilizing stop members 31 and 32 it is possible for this system to produce telecentric images which remain consistently of the same size regardless of adjustment of the optical system 20 in the Z direction.

While this invention has been illustrated in connection with only certain embodiments of thereof, it will be apparent that it is capable of further modification, and that this application is intended to cover any such modifications that may fall within the scope of one skilled in the art, or the appended claims.

I claim:

1. A method of determining the Z height measurements of features on the surface of an inspected object relative to an object plane, comprising providing two optical systems the optical axes of which are inclined equi-angularly with respect to a central Z axis, and which intersect each other and the Z axis in an object plane, projecting two images of the same features of an object, which is disposed in said plane, respectively along the two optical axes of said systems to the image detectors of two different video cameras for projection thereby onto a video monitor, determining the extent to which a feature in one of said projected images on said monitor is laterally offset in an X direction from the center of said one image relative to the corresponding offset of the same feature in the other of said projected images, and utilizing the amount of the difference of said offsets to determine the Z height measurement of said feature relative to said object plane.

2. The method as recited in claim 1 including determining said Z height measurement of said feature by dividing the difference of said offsets in the X direction by twice the tangent of the angle at which each of said optical axes is inclined to said Z axis.

3. The method as recited in claim 1, including superimposing said two projected images on each other at said monitor, moving said two optical systems along said Z axis until said feature in said one projected image coincides and registers with said same feature in said other projected image, and determining the distance said two optical systems were moved along the Z axis, which distance constitutes the Z height of said feature.

4. The method as defined in claim 3, wherein said one image is projected in one color onto said monitor and said other of said images is projected in a different color onto said monitor.

5. Apparatus for producing stereoscopic images of features on the surface of an object to measure the height of the features along a central Z axis, comprising a support having a pair of spaced video cameras mounted thereon, and each of said cameras containing an image detector, a pair of optical systems mounted on said support with the optical axes thereof inclined to and intersecting each other and a central Z axis in an object plane extending normal to the Z axis, each of said optical systems registering at one end with the surface of an object positioned in said object plane, an at its opposite end with the image detector in one of said cameras, and said optical systems including means for projecting two stereoscopic images of the same features on the surface of said object along, respectively, the two optical axes of said systems to the image detectors of said cameras for recording thereby, said image detectors being disposed in planes inclined to each other and to said object plane, each of said cameras having an image axis extending normal to the plane of its associated image detector, and the image axes of said cameras being inclined to and intersecting each other and the Z axis at a point spaced above said object plane.

6. Apparatus as defined in claim 5, wherein said optical axes are equiangularly inclined each at a first angle with respect to said Z axis, and said image axes of said cameras are equiangularly inclined each at a second angle with respect to said Z axis.

7. Apparatus as defined in claim 6, wherein said second angle is twice the value of said first angle.

8. Apparatus as defined in claim 5, wherein each of said optical systems includes means for projecting the image of a reticle onto the surface of an object disposed in said object plane, whereby each of the two stereoscopic images projected to the image detectors of said cameras include a reticle image.

9. Apparatus as defined in claim 5, wherein each of said optical systems includes a set of telecentric imaging lenses.

10. Apparatus for producing stereoscopic images of features on the surface of an object to measure the height of the feature along a central Z axis, comprising a support having a pair of spaced video cameras mounted thereon, and each of said cameras containing an image detector, a pair of optical systems mounted on said support with the optical axes thereof inclined to and intersecting each other and a central Z axis in an object plane extending normal to the Z axis, each of said optical systems registering at one end with the surface of an object positioned in said object plane, and at its opposite end with the image detector in one of said cameras, said optical systems including means for projecting two stereoscopic images of the same features on the surface of said object along, respectively, the two optical axes of said systems to the image detectors of said cameras for recording thereby, and means for displaying on a monitor the two stereoscopic images recorded by said cameras, whereby the Z height of a feature on the surface of said object is proportional to the difference in the lateral offset of said feature from the center of one of said stereoscopic images with respect to its lateral offset from the center of the other of said stereoscopic images.

11. Apparatus as defined in claim 10, including means mounting said support for movement selectively in opposite directions along the Z axis thereby selectively to move said one ends of said optical systems toward and away from an object positioned in said object plane, said displaying means being operable to display said two stereoscopic images in superimposed relation as a single stereoscopic image on said monitor, whereby two images of said feature are slightly offset laterally from each other in said stereoscopic image, and means for determining the Z height of said feature with respect to the object plane by moving said support on the Z axis until said two images of said feature merge, whereby the amount of movement of said support in the Z direction equals the Z height of said feature.

* * * * *